US012490692B2

(12) United States Patent
Gurau et al.

(10) Patent No.: US 12,490,692 B2
(45) Date of Patent: Dec. 9, 2025

(54) AUTONOMOUS ROBOTIC FOREST ROVER FOR AUTOMATED RESIN COLLECTION

(71) Applicants: Georgia Southern University Research and Service Foundation, Inc., Statesboro, GA (US); B&L Naval Stores Inc., Hinesville, GA (US)

(72) Inventors: Vladimir Gurau, Statesboro, GA (US); Lloyd Busby, Hinesville, GA (US)

(73) Assignees: Georgia Southern University Research and Service Foundation, Inc.; B&L Naval Stores Inc.

( * ) Notice: Subject to any disclaimer, the term of this patent is extended or adjusted under 35 U.S.C. 154(b) by 664 days.

(21) Appl. No.: 17/331,124

(22) Filed: May 26, 2021

(65) Prior Publication Data
US 2022/0022388 A1   Jan. 27, 2022

Related U.S. Application Data

(60) Provisional application No. 63/056,905, filed on Jul. 27, 2020.

(51) Int. Cl.
*A01G 23/14* (2006.01)
*B25J 5/00* (2006.01)
(Continued)

(52) U.S. Cl.
CPC .............. *A01G 23/14* (2013.01); *B25J 5/00* (2013.01); *B25J 9/1679* (2013.01); *B25J 9/1697* (2013.01);
(Continued)

(58) Field of Classification Search
CPC ......... A01G 23/10; A01G 23/14; B25J 5/007; B25J 11/005
(Continued)

(56) References Cited

U.S. PATENT DOCUMENTS 3,909,150 A * 9/1975 Schaer ................. B23Q 16/003
408/130
4,090,328 A * 5/1978 Enos, Jr. ................. A01G 7/06
47/57.5
(Continued)

FOREIGN PATENT DOCUMENTS

| AU | 2009212990 A1 * | 3/2010 | ............. A01G 23/10 |
| WO | 2018/035490 | 2/2018 | |
| WO | WO-2020014719 A1 * | 1/2020 | ............. A01G 23/00 |

OTHER PUBLICATIONS

Russell Library, History-American Turpentine Farmers Association (2010), 5 pages. http://russelldoc.galib.uga.edu/atfa/history/index.html.
(Continued)

*Primary Examiner* — Richard Green
*Assistant Examiner* — Kevin M Dennis
(74) *Attorney, Agent, or Firm* — Meunier Carlin & Curfman LLC

(57) ABSTRACT

Provided are robotic systems and methods for identifying a particular type of tree or plant (e.g., slash pine trees), for tapping them and collect their oleoresin for processing using an autonomous, long-range robotic forest rover. One aspect of the system comprises an autonomous vehicle equipped with an industrial robot, automated tool changer, a plurality of tools required for robotic operations, vision and navigation systems and powertrain for long-range operation. The rover identifies healthy, mature trees or plants, approaches them and performs the robotic operations required for tapping the trees or plants. In addition to these tasks, the Global Navigation Satellite System (GNSS) coordinates of the tree or plant is recorded along with its diameter, and a digital
(Continued)

image of the tree or plant. This information is communicated to a base station for creating and updating a tree farm database.

6 Claims, 10 Drawing Sheets

(51) Int. Cl.
    *B25J 9/16*     (2006.01)
    *B25J 15/04*     (2006.01)
    *B60L 50/60*     (2019.01)
    *B60L 50/70*     (2019.01)
    *G05D 1/00*     (2024.01)

(52) U.S. Cl.
    CPC ............ *B25J 15/04* (2013.01); *G05D 1/0214* (2013.01); *G05D 1/0231* (2013.01); *G05D 1/0278* (2013.01); *B60L 50/60* (2019.02); *B60L 50/70* (2019.02); *B60L 2210/40* (2013.01); *G05B 2219/40298* (2013.01)

(58) Field of Classification Search
    USPC ...................................... 47/10, 11, 12; 901/1
    See application file for complete search history.

(56) References Cited

U.S. PATENT DOCUMENTS

| | | | | |
|---|---|---|---|---|
| 4,176,495 | A * | 12/1979 | Dale | A01G 7/06 47/10 |
| 4,366,648 | A * | 1/1983 | Morin | A01G 23/10 47/52 |
| 4,664,588 | A * | 5/1987 | Newell | B23Q 1/0063 414/730 |
| 5,413,454 | A * | 5/1995 | Movsesian | B25J 9/046 414/722 |
| 6,321,145 | B1 * | 11/2001 | Rajashekara | B60L 58/30 429/432 |
| 9,848,541 | B2 * | 12/2017 | Davis | A01G 23/10 |
| 10,905,055 | B2 * | 2/2021 | Busby, IV | B05B 17/04 |
| 11,203,120 | B1 * | 12/2021 | Hill | B25J 9/0087 |
| 11,772,266 | B2 * | 10/2023 | Ding | B25J 9/1661 700/216 |
| 2011/0308215 | A1 * | 12/2011 | Paquette | A01G 3/08 56/10.6 |
| 2015/0034209 | A1 * | 2/2015 | Davis | A01G 23/10 144/93.1 |
| 2018/0049380 | A1 * | 2/2018 | Busby, IV | B05B 17/04 |
| 2018/0092304 | A1 * | 4/2018 | Moore | B25J 9/0084 |
| 2018/0317397 | A1 * | 11/2018 | Carter | G05B 19/182 |
| 2019/0079532 | A1 * | 3/2019 | Crawley | B25J 11/008 |

OTHER PUBLICATIONS

Borenstein J. and Koren Y.: "The Vector Field Histogram—Fast Obstacle Avoidance for Mobile Robots", IEEE Journal of Robotics and Automation vol. 7,(3), pp. 278-288 (1991).

C. W. Bac, J. Hemming, B.A.J. van Tuijl, R. Barth, E. Wais, and E. J. van Henten: "Performance Evaluation of a Harvesting Robot for Sweet Pepper," Journal of Field Robotics., ch7, 25 pages (2017).

O. Bawden, J. Kulk, R. Russell, C. McCool, A. English, F. Dayoub, C. Lehnert, and T. Perez: "Robot for weed species plant-specific management," Journal of Field Robotics., vol. 34, No. 6, pp. 1179-1199, (2017).

T. Botterill S. Paulin, R. Green, S. Williams, J. Lin, V. Saxton, S. Mills, X. Chen, and S. Corbett-Davies: "A Robot System for Pruning Grape Vines," Journal of Field Robotics., vol. 34, No. 6, pp. 1100-1122, (2017).

A. Halme and M. Vainio. Forestry robotics—why, what and when. In "Autonomous Robotic Systems" (A. T. de Almeida and O. Khatib, eds.), pp. 149-162. Springer London, London (1998).

A.W. Hodges, and J.D. Johnson, Borehole Oleoresin Production from Slash Pine. Southern Journal of Applied Forestry., vol. 21 No. 3: p. 108-115 (1997).

M. Imperoli, C. Potena, D. Nardi, G. Grisetti and A. Pretto: "An effective multi-cue positioning system for agricultural robotics," IEEE Robotics Automation Letters., vol. 3, No. 4 pp. 3685-3692, (2018).

Kadeghe G.Fue, Wesley M. Porter, Edward M. Barnes, and Glen C. Rains: "An extensive review of mobile agricultural robotics for field operations: focus on cotton harvesting,"AgriEngineering. vol. 2, pp. 150-174, (Mar. 4, 2020).

Kourtz, P., and Strome, M. "Autonomous Forest Stand-Tending Robots." In Proc. Meeting Stat. Methods (M. Kohl and G. A. Gertner eds.), pp. 10. WSL/FNP Birmensdorf, Switzerland, Berlin/ Eberswalde, Germany (1993), 71-78.

H. Kurita, M. Iida, W. Cho, and M. Suguri: "Rice Autonomous Harvesting: Operation Framework," Journal of Field Robotics., vol. 34, No. 6, pp. 1084-1099, (2017).

M. Nørremark, H. W. Griepentrog, J. Nielsen, and H. T. Søgaard: "The development and assessment of the accuracy of an autonomous GPS-based system for intra-row mechanical weed control in row crops," Biosyst. Eng., vol. 101, No. 4, pp. 396-410, (2008).

Parker, R., Bayne, K., and Clinton, P. (2016). Robotics in forestry. New Zealand Journal of Forestry 60, 8-14.

A. Silwal, J. R. Davidson, M. Karkee, C. Mo, Q. Zhang, and K. Lewis: "Design, integration, and field evaluation of a robotic apple harvester," Journal of Field Robotics., vol. 34, No. 6, pp. 1140-1159, (2017).

J. Underwood, A. Wendel, B. Schofield, L. McMurray, and R. Kimber: "Efficient in-field plant phenomics for row-crops with an autonomous ground vehicle," Journal of Field Robotics., vol. 34, No. 6, pp. 1061-1083, (2017).

Conway, D. (2014). Robots in Agriculture Could Save the Sector Billions. ARK Investment Management.

Cunningham, A. (2012). Pine resin tapping techniques used around the world. In "Pine Resin: Biology, Chemistry and Applications" (A. G. Fett-Neto and K. C. S. Rodrigues-Correa eds.) Research Signpost: Kerala, India.

Ghaffarzadeh, K. (2018). Agricultural Robots and Drones 2018-2038. https://www.idtechex.com/research/reports/agricultural-robots-and-drones-2018-2038-mtechnologies-markets-and-players-000578.asp.

Lauture, M. J. (2017). Reinvigorating Oleoresin Collection in the Southeast USA: Evaluation of Chemical Inducers, Stand Management, Tree Characterisitics, and Genetics. Doctoral Dissertation, University of Florida Gainesville, FL. 275 pages.

Mueller-Sim, T., Jenkins, M., Abel, J., and Kantor, G. (2017). The Robotanist: a ground-based agricultural robot for high-throughput crop phenotyping. In "2017 IEEE International Conference on Robotics and Automation (ICRA)", pp. 3634-3639.

* cited by examiner

```
┌─────────────────────────────────────────────────────────┐
│  Load The Spindle From The Tool Stand And Drill One Or More │
│  Converging Boreholes In The Tree/Plant At Angles That Allow The │
│              Flow Of Oleoresin Due To Gravity           │
│                          2002                           │
└─────────────────────────────────────────────────────────┘
                              │
┌─────────────────────────────────────────────────────────┐
│  Replace The Spindle With A Sprayer And Spray The Boreholes │
│  With Resin Flow Stimulating Chemicals And Spray The Tree Trunk │
│                   With An Insecticide                   │
│                          2004                           │
└─────────────────────────────────────────────────────────┘
                              │
┌─────────────────────────────────────────────────────────┐
│   Replace The Sprayer With A Robot Gripper And The Robot │
│  Gripper Picks A Tube With A Pre-Attached Collection Bag And │
│  Taps One Of The Boreholes, Then The Robot Gripper Picks Plugs │
│  For Any Remaining Untapped Boreholes And Caps The Untapped │
│                 Boreholes With The Plugs                │
│                          2006                           │
└─────────────────────────────────────────────────────────┘
                              │
┌─────────────────────────────────────────────────────────┐
│  Record The Location And Diameter Of The Tree, And Capture │
│  And, Store One Or More Digital Images Of The Tree And Create │
│         Or Update A Tree Farm Map And Database          │
│                          2008                           │
└─────────────────────────────────────────────────────────┘
```

FIG. 2B

```
┌─────────────────────────────────────────────────────────┐
│  Predefining A Tool Frame (Cartesian Coordinate System) │
│  Associated To Each Tool Loaded To The Robot's End-Of-Arm And │
│       Having One Axis (Z-Axis) Along The Tool Axis      │
│                          3002                           │
└─────────────────────────────────────────────────────────┘
                             │
┌─────────────────────────────────────────────────────────┐
│  Predefining A User Frame Associated To The Borehole That Has │
│  To Be Drilled, Tapped Or Capped And Having Its Axes Parallel To │
│     The Tool Frame And One Axis (Z-Axis) Along The Axis Of The  │
│                        Borehole                         │
│                          3004                           │
└─────────────────────────────────────────────────────────┘
                             │
┌─────────────────────────────────────────────────────────┐
│   The Robot Moves The Center Of The Tool Along The Axis Of The  │
│                        Borehole                         │
│                          3006                           │
└─────────────────────────────────────────────────────────┘
```

FIG. 3B

ND ROBOTIC FOREST ROVER
AUTONOMOUS ROBOTIC FOREST ROVER FOR AUTOMATED RESIN COLLECTION

CROSS-REFERENCE TO RELATED APPLICATION

This application claims priority to and benefit of U.S. provisional patent application Ser. No. 63/056,905 filed Jul. 27, 2020, which is fully incorporated by reference and made a part hereof.

GOVERNMENT SUPPORT CLAUSE

This invention was made with government support under United States Department of Agriculture contract #2019-33610-29797. The government has certain rights in the invention.

TECHNICAL FIELD

The embodiments disclosed herein generally relate to robotics in agriculture and forestry, agricultural automation, autonomous vehicles and field robots. In particular, the embodiments relate to the naval stores industry. More particularly, the embodiments are directed towards an automated, unmanned technology for identifying slash pine trees and for performing operations required for their oleoresin collection.

BACKGROUND

Resin from slash pine (*Pinus elliottii* Engelm.) represents a renewable and alternative source to petrochemicals for a wide variety of industrial, commercial, and household products. Historically, the collection of slash pine oleoresin and the manufacture of products from it represented a significant industry in the Southeastern United States. According to the archived records of the American Turpentine Farmers Association, the USA produced 53% of the world's turpentine in 1937, and oleoresin produced peaked in 1949 [1]. The industry began its slow decline not long after due to petrochemicals, labor costs, and foreign competition. By 1980, only 300 gum producers existed, and the last US oleoresin processing plant closed in 1991. Except for a few boutique farmers and stills, the industry has been dormant since then. Forces such as the volatility of the oleoresin import market, reduced exports from other countries as the USA's primary supplier, as well as the push towards renewable, recyclable materials and biofuels, indicate the oleoresin and turpentine industry is ready for a resurgence in Southeastern United States. This resurgence will require novel technologies to achieve and sustain competitiveness in a world market.

Traditionally, the work required for tapping slash pine trees and collect their oleoresin includes the following activities:
  Identifying slash pine trees having a trunk of at least approximately 8 inches in diameter at chest height (approximately five feet above ground level);
  Drilling three converging boreholes in the tree trunk at angles that allow the flow of oleoresin due to gravity. One of these holes, situated at approximately six inches above the ground holds a section of PVC tube connected to a resin collection vessel; the two connecting holes located above the tapping hole increase communication within the tree trunk and the surface area generating oleoresin flow.
  Manually spraying the three boreholes with resin flow stimulating chemicals.
  Manually tapping the lower borehole with a PVC tube connected to a collection vessel.
  Manually capping the reminding two boreholes to prevent them from desiccating and the turpentine from evaporating.

Besides being labor intensive, the second activity requires the alignment of the three boreholes in the tree trunk at specified angles such that they converge in the same point. State-of-the-art technology comprised of special drill jigs attached to a tractor has been described in WO 2018/035490 published Feb. 22, 2018, which is incorporated by reference; however, this mechanization requires assistance by human operators. Typically, the tapping activities occur at the beginning of the oleoresin harvesting season when a worker typically taps hundreds of pine trees daily.

Therefore, systems and methods are needed that overcome challenges in the art, some of which are described herein. In particular, a fully automated, autonomous technology capable of identifying mature slash pine trees, approach them and perform the tapping operations required for collecting their oleoresin is desired.

SUMMARY

Disclosed and described herein are systems and methods of automated resin collection using an autonomous robotic forest rover.

It is a first object to provide a robotic technology to identify and tap slash pine trees and collect their oleoresin for processing using an unmanned, fully autonomous, long-range robotic forest rover. In one aspect the system comprises an autonomous vehicle (rover) equipped with an industrial robot, automated tool changer, a plurality of tools required for robotic operations, vision and navigation systems and powertrain for long-range operation. In various aspects, the integrated system may use Light Detection and Ranging (LIDAR) technology, machine vision, or a combination of thereof to identify cylindrical objects equal to, or larger than approximately 8 inch in diameter at an approximate 5 foot elevation from the ground and to identify based on image analysis of the bark whether the object is a slash pine tree. Upon positive identification of the mature slash pine tree, the rover uses its navigation system to approach it within working distance. It avoids obstacles using LIDAR, machine vision or a combination of thereof along with mathematical algorithms for obstacle avoidance. After arrival within working distance from the pine tree, the industrial robot performs the operations required for tapping it. In addition to these tasks, the system records the Global Navigation Satellite System (GNSS) coordinates of the tree, its diameter, stores digital images of the tree and creates or updates a tree farm map and database. The disclosed rover may be equipped with a high fuel-to-electricity conversion efficiency powertrain used for long-range motive and auxiliary power. In one embodiment, the powertrain comprises a high-temperature proton exchange membrane fuel cell (HT-PEMFC) stack, methanol reformer for on-board production of hydrogen, methanol tank, electrochemical hydrogen pump, battery and DC to AC inverter.

It is another object to provide an algorithm for identifying mature slash pine trees and for approaching them for robotic tapping operations.

It is another object to provide a method and sequence of operations required for robotic tapping of the slash pine trees.

It is another object to provide a method of aligning the tools with the axis of the borehole and of feeding the tools along this axis during the drilling or insertion operations and thus minimizing the chances of jamming the tool.

It is yet another object to provide a method of identifying the position of the borehole mouth in conditions of large variations in the shape of the tree trunk and in the relative position between the industrial robot and the tree after the rover positions itself in front of the tree. This is particularly challenging during the process of inserting the tube with collection bag or the two plugs in the boreholes, since misestimation of its position will lead to either an incomplete insertion or may result in breaking the tool.

It is finally another object to provide a method to control the insertion force of the tube with collection bag and of the plugs in the boreholes.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2B illustrates a process performed by the on-board processor of the autonomous forest rover by executing computer-executable instructions for tapping a tree or plant;

FIG. 3B is a flowchart that illustrates a process to align the tool with the axis of the borehole and to accurately feed the tool along this axis;

DETAILED DESCRIPTION

Figure 1A:
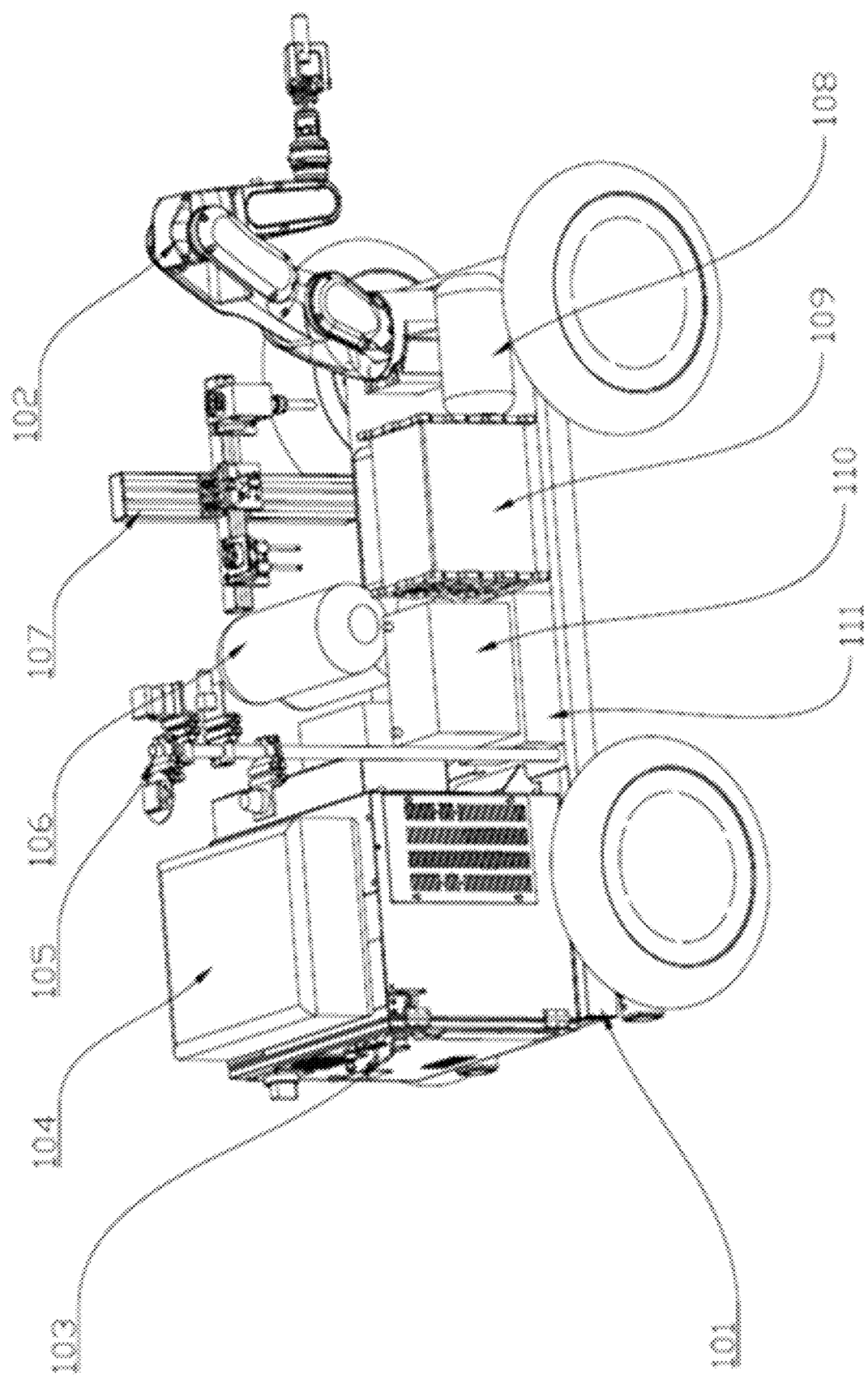
FIG. 1A is a perspective view of an embodiment of a robotic forest rover.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As shown in FIG. 1A, the robotic technology used for identifying slash pine trees and for tapping them for oleoresin collection comprises an autonomous forest rover 101 equipped with an industrial robot 102, the robot controller 103, rover navigation controls 104, camera, sensors and instruments used for navigation, obstacle avoidance, odometry and image analysis 105, an air compressor 106 for actuating the automated tool changers and various tools, a tool stand 107 for automated tool changing, tanks with flow-stimulating chemicals and insecticide used for spraying the boreholes and the tree trunk (not shown) and powertrain for long-range motive and auxiliary power. In one embodiment, the powertrain with high fuel-to-electricity conversion efficiency can be comprised of a HT-PEMFC stack 109 with methanol reformer for on-board production of hydrogen and with electrochemical hydrogen pump, methanol tank 108, battery 110 and a DC to AC power inverter 111. Other embodiments may have different powertrains.

In some instances, the navigation controls 104 comprise a real-time-target computer with input/output modules for communication with sensors and other peripherals and installed with a real-time-operating system and control software for navigation and other operations, and a coprocessor computer with software installed for processing machine vision, navigation and other operations. The navigation controls 104 may also include a networking system with wireless capability for data communication between the real-time-target computer, coprocessor computer, a base station computer and other peripherals.

Figure 1B:
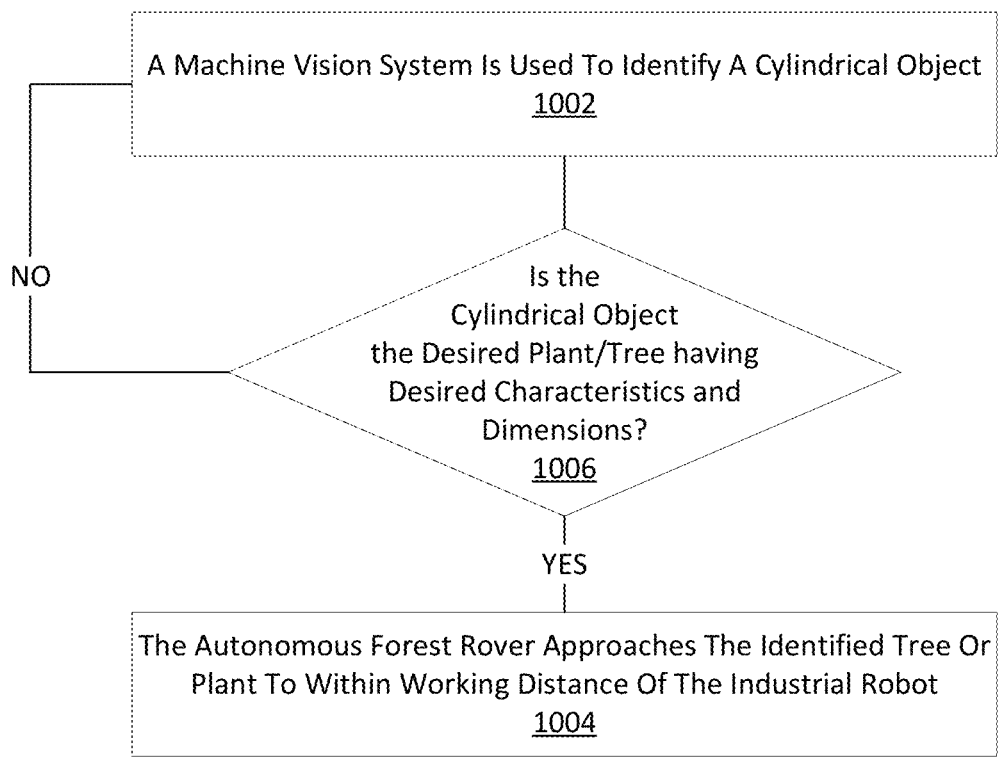
FIG. 1B illustrates a flowchart for the steps performed for identifying and approaching a particular tree or plant.

In some instances, the robotic technology uses an Observe-Orient-Decide-Act (OODA) algorithm for identifying a particular tree or plant (e.g., a slash pine tree), and to approach the identified tree or plant for robot operations. The algorithm is executed by a processor on-board the autonomous forest rover 101. The processor may comprise all or a part of a computing device (described in greater detail herein) on-board the autonomous forest rover 101. For example, the processor may comprise all or a portion of the robot controller 103 or all or part of the navigation controls 104. FIG. 1B illustrates a flowchart for the steps performed for identifying and approaching a particular tree or plant. At step 1002, a machine vision system 105 is used to identify a candidate tree or plant. In some instances, the candidate tree or plant is selected based on characteristics of the tree or plant. Such characteristics may include the diameter of the tree or plant at a certain height or range of heights above ground level as determined by the processor using the machine vision system 105. Other characteristics may include the shape (e.g., "roundness") of the trunk of the tree or plant at the descried height or range of heights and whether there are any branches or other protrusions from the trunk at the height and/or range of heights. For example, the machine vision system 105 may identify cylindrical objects equal to, or larger than approximately 8 inches in diameter at approximately a 5 feet elevation from the ground At 1004, using the machine vision system 105, the bark or other distinguishing characteristics (e.g., presence or absence of leaves or needles, leaf/needle shape and/or color, blooms or flowers, etc.) of the tree or plant is used to identify whether the cylindrical object is the desired particular plant or tree (e.g., a slash pine tree). If, at 1004, the candidate tree or plant is not identified as the desired particular plant or tree, then the process goes to 1002, where another candidate tree or plant is identified by the machine vision system 105. This step may also involve movement of the autonomous forest rover 101 to another location. If, at 1004, the candidate tree or plant is identified as the desired particular plant or tree, then at 1006 the autonomous forest rover 101 approaches the identified tree or plant to within working distance of the industrial robot 102.

In one exemplary embodiment, the OODA algorithm includes using LIDAR and vision system 105 for identifying cylindrical objects equal to, or larger than an approximately 8 inch diameter at approximately 5 feet elevation from the ground; using image analysis of the tree bark to identify whether the cylindrical object is a slash pine tree; upon positive identification of the mature slash pine tree, approaching it within working distance using navigation system with path planning and odometry and based on sensors such as, but not limited to rotary encoders or GNSS 105; avoiding obstacles using LIDAR, machine vision 105 or a combination of thereof along with mathematical algorithms such as, but not limited to Vector Field Histogram [2].

Figure 2A:
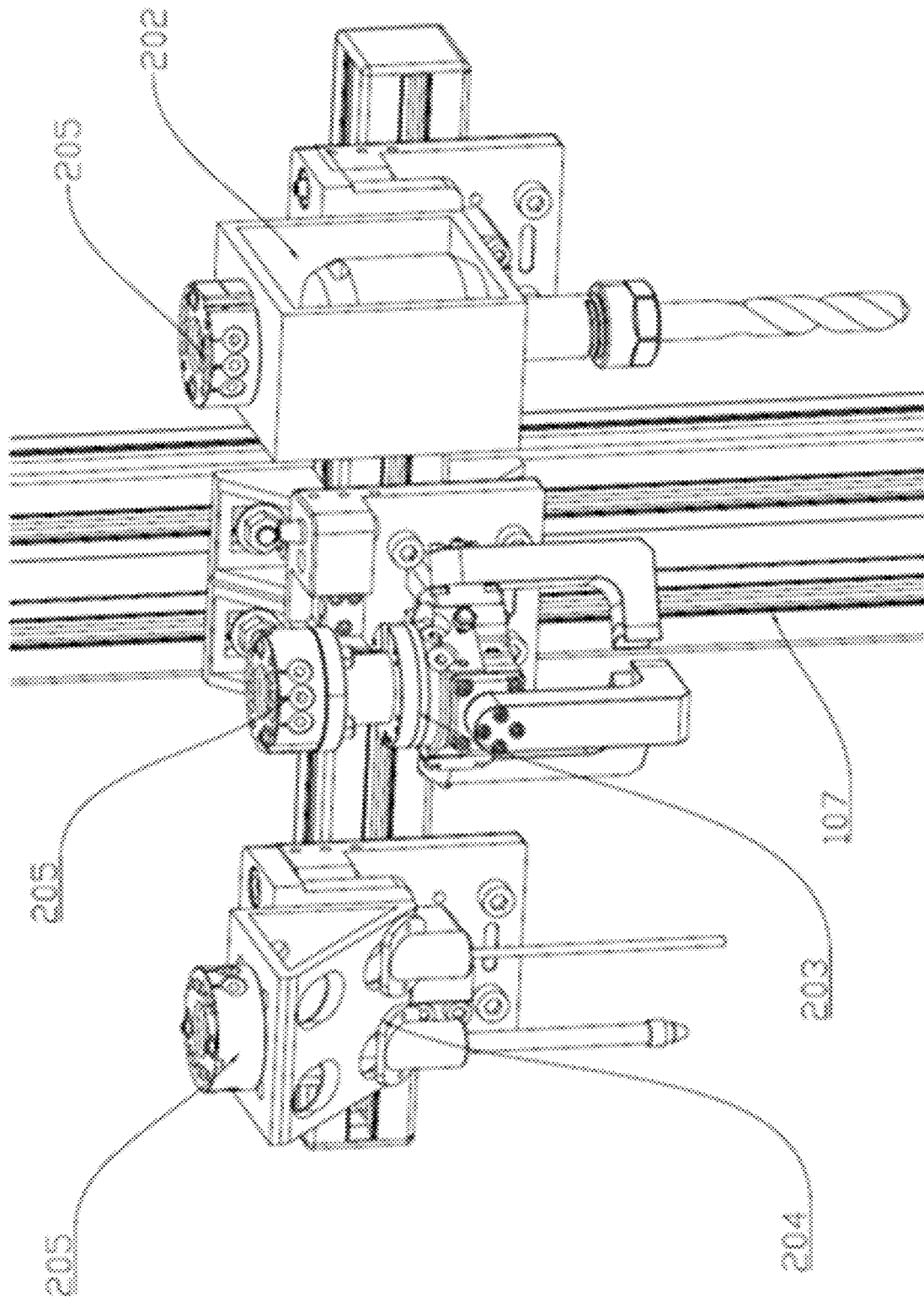
FIG. 2A is a perspective view of an exemplary tool stand used by embodiments of the robotic forest rover, where the tool stand holds a plurality of tools, all equipped with quick-connecting systems.

Referring next to FIG. 2A, the industrial robot 102 uses a plurality of tools to perform the robotic operations required for tapping the tree. The tooling includes but is not limited to one or more of a spindle for drilling the boreholes 202, a robot gripper 203 for manipulating the tube with pre-attached collection bag and the two plugs, and a sprayer with two nozzles 204 for spraying the boreholes with flow-stimulating chemicals and the tree trunk with insecticide. Each tool is equipped with a pneumatically or electrically actuated tool-side quick-connect 205 that allows the robot 102 to load them to its end-of-arm before a specific operation and to release them on the tool stand 107 at the end of the operation. In one embodiment, the robot gripper 203 comprises a pneumatically or electrically actuated robot hand with a plurality of fingers. In one embodiment, the spindles for drilling the boreholes are mounted on a plurality of linear actuators driven by stepper or servo motors. In this embodiment, the industrial robot performs the spraying and insertions operations, while the drilling operations are performed by the spindles mounted on linear actuators. FIG. 2B illustrates a process performed by the on-board processor of the autonomous forest rover 101 by executing computer-executable instructions for tapping a tree or plant. The process comprises a sequence of robot operations for tapping the selected tree or plant (e.g., pine tree). The process includes 2002, loading the spindle 202 from the tool stand 107 and drilling one or more (e.g., three converging) boreholes in the pine tree at angles that allow the flow of oleoresin due to gravity. At 2004, the spindle is replaced with a sprayer (e.g., two-nozzle sprayer 204) and the boreholes are sprayed with resin flow stimulating chemicals and the tree trunk is sprayed with an insecticide. At 2006, the sprayer is replaced with the robot gripper 203 and the robot gripper 203 picks a tube with a pre-attached collection bag and taps one of the boreholes, then the robot gripper 203 picks plugs for any remaining untapped boreholes and caps the other boreholes with the plugs. At 2008, the on-board processor of the autonomous forest rover 101 executes computer-executable instructions to record the GNSS coordinates of the tapped tree using, for example, a real-time kinematic global positioning system (RTK-GPS) sensor 105, records its diameter, stores digital images of the tree and creates or updates a tree farm map and database. It is to be appreciated that this information (all or a portion) may be stored locally in a memory on-board the autonomous forest rover 101 (permanently and/or temporarily) and/or transmitted to a base station for storage and/or analysis. Generally, if transmitted it will be transmitted wirelessly to the base station.

Figure 3A:
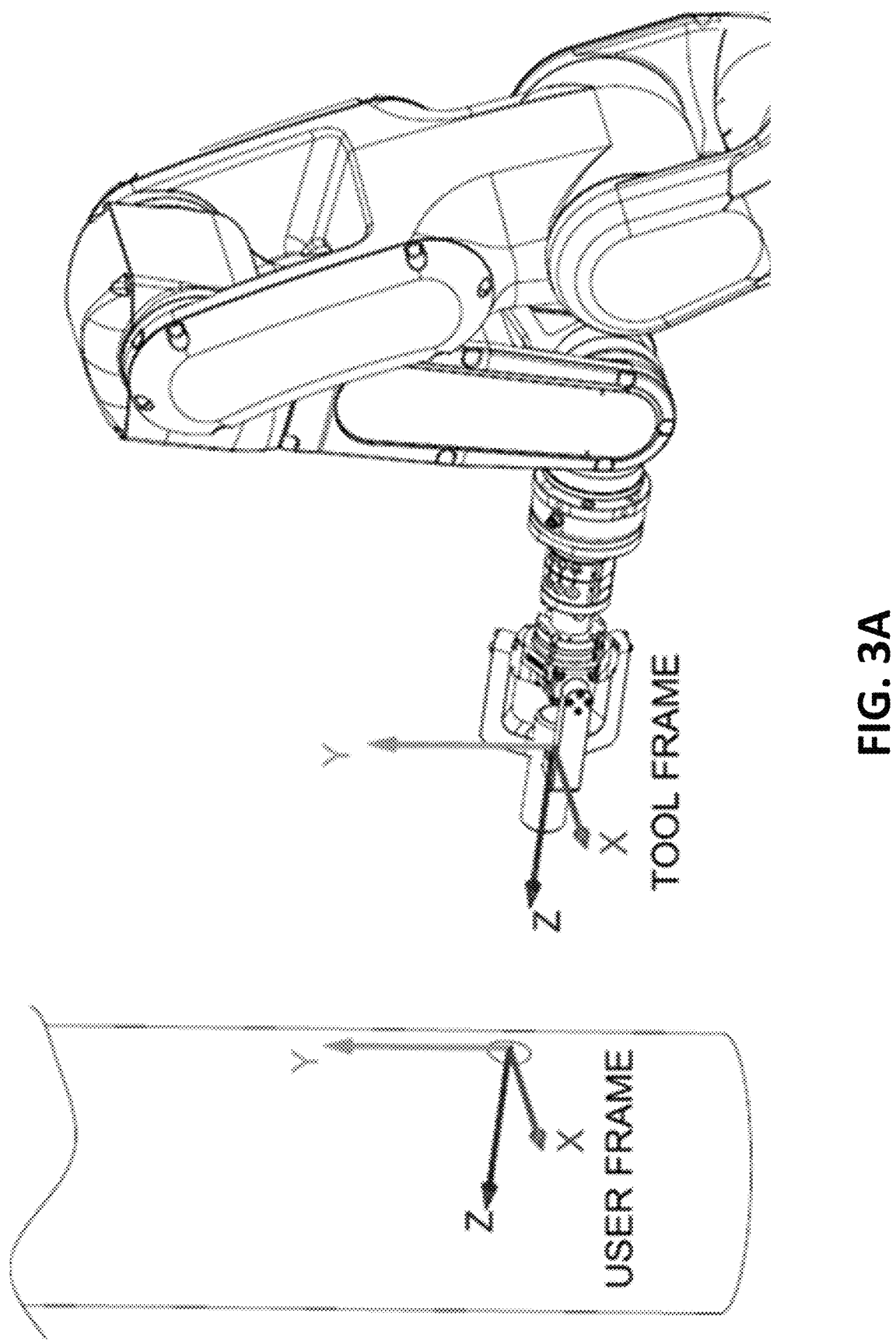
FIG. 3A is a perspective view of an exemplary industrial robot with a robotic gripper loaded to its end-of-arm and ready to insert the tube in one borehole in the tree. The figure illustrates the coordinate system (frame) associated to the loaded tool and the frame associated to the borehole.

While trivial to a human operator, there is a significant challenge when executing the robotic operations required for tapping slash pine trees by a serial link manipulator with all revolute joints and having a limited payload and rigid joints. The challenge is in the requirement to accurately align the tool with the axis of the borehole and to accurately feed the tool along this axis. A more thorough understanding of the method used to address this challenge can be gained from reading the following description along with viewing FIGS. 3A and 3B. The disclosed method comprises 3002, predefining a tool frame (cartesian coordinate system) associated to each tool loaded to the robot's end-of-arm and having one axis (Z-axis) along the tool axis; then 3004, predefining a user frame associated to the borehole that has to be drilled, tapped or capped and having its axes parallel to the tool frame and one axis (Z-axis) along the axis of the borehole. At 3006, the robot moves the center of the tool along the axis of the borehole. When programming the robot for operation, this method ensures that the axis of the tool/tube is oriented along the axis of the borehole and that the tool/tube is precisely inserted along the borehole, thus minimizing the chance of being jammed.

Figure 4A:
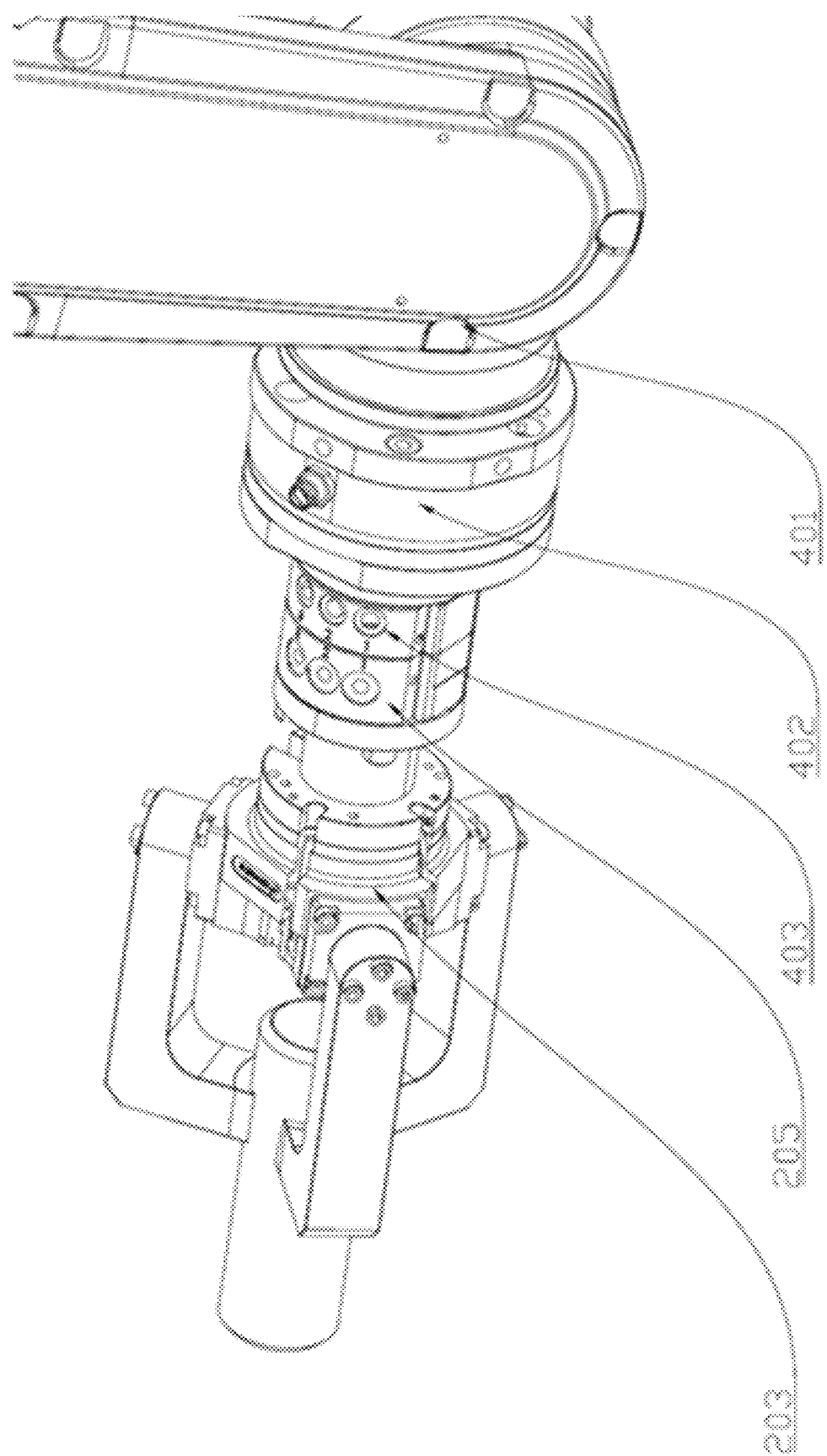
FIG. 4A is a perspective view of the robot gripper loaded to the robot end-of-arm and illustrates a force/torque sensor attached to the robot end-of-arm and the quick-connect for changing tools.
Figure 4B:
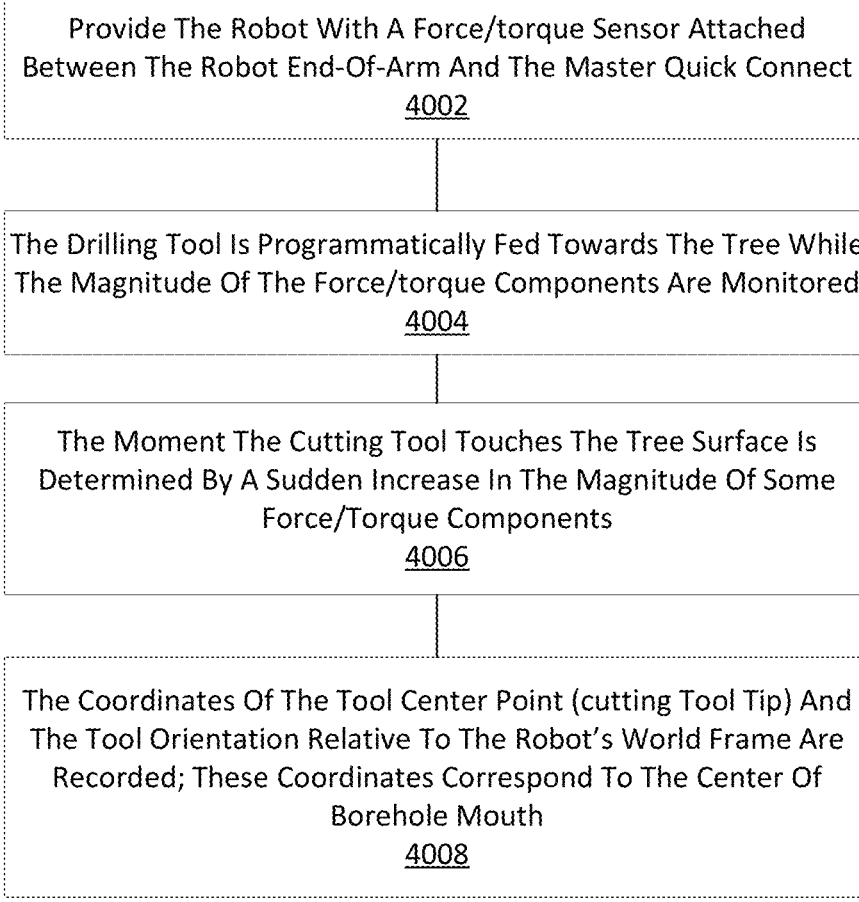
FIG. 4B is a flowchart that illustrates a process to identify the position of the borehole mouth.

A second challenge in executing the robotic operations required for tapping slash pine trees is in the uncertainty of the position of the borehole mouth (starting point) and derives from the large variations in the shape of the tree trunk and in the relative position between the industrial robot 102 and the tree after the rover 101 positions itself in front of the tree. This is particularly important during the process of inserting the tube with the collection bag or the plugs in the boreholes, since misestimation of its position may lead to either an incomplete insertion or may result in breaking the tool. A more thorough understanding of the method used to address this challenge can be gained from the following description along with viewing FIGS. 4A and 4B. The method comprises 4002 providing the robot with a force/torque sensor 402 attached between the robot end-of-arm 401 and the master quick connect 403. At 4004, the drilling tool is programmatically fed towards the tree while the magnitude of the force/torque components are monitored. At 4006, the moment the cutting tool touches the tree surface is determined by a sudden increase in the magnitude of some force/torque components. At this moment, at 4008, the coordinates of the tool center point (cutting tool tip) and the tool orientation relative to the robot's world frame are recorded programmatically in global position registers. These coordinates correspond to the center of borehole mouth. From this point, the cutting tool continues to drill the borehole of a predefined depth. When the borehole is sprayed, tapped or capped, the location of the borehole mouth and the orientation of the borehole axis are thus known.

Figure 4C:
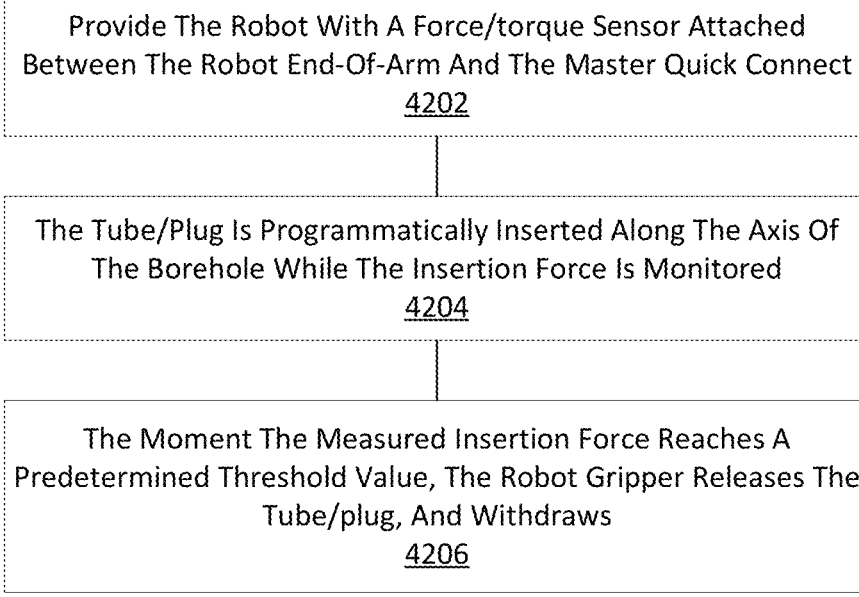
FIG. 4C is a flowchart that illustrates robotic operations required for tapping a tee or plant.

A third challenge in performing the robotic operations required for tapping slash pine trees is illustrated in the flowchart of FIG. 4C. This method comprises a tube with a pre-attached collection bag inserted in one of the boreholes and plugs are inserted in any other boreholes. The tube and the plugs are each inserted with a specified force. The method comprises 4202 equipping the robot with a force/torque sensor 402 attached between the robot end-of-arm 401 and the master quick connect 403. At 4204, the tube/plug is programmatically inserted along the axis of the borehole while the insertion force is monitored. At 4206, the moment the measured insertion force reaches a predetermined threshold value, the robot gripper releases the tube/plug, and withdraws.

Computing Environment

Figure 5:
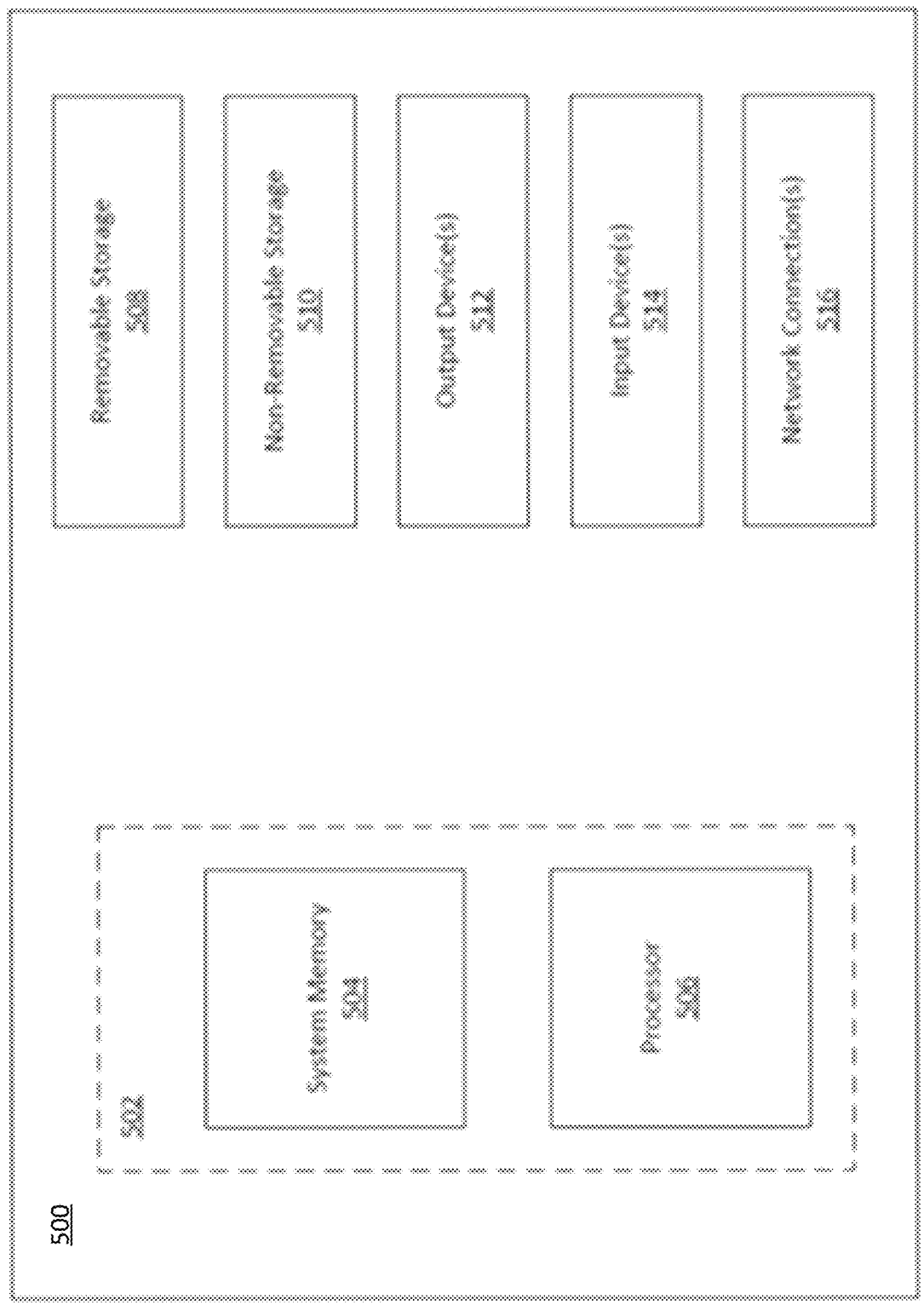
FIG. 5 shows an exemplary computing device upon which aspects of embodiments described herein may be implemented.

When the logical operations described herein are implemented in software, the process may execute on any type of computing architecture or platform. For example, referring to FIG. 5, an example computing device (i.e., processing unit) upon which embodiments may be implemented is illustrated. The processing unit may comprise all or a portion of the robot controller 103, the navigation controls 104 and/or the base station computer. The processing unit 500 may include a bus or other communication mechanism for communicating information among various components of the processing unit 500. In its most basic configuration, processing unit 500 typically includes at least one processor 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processor 506 may be a standard programmable processor that performs arithmetic and logic operations necessary for operation of the processing unit 500.

Processing unit 500 may have additional features/functionality. For example, processing unit 500 may include additional storage such as removable storage 508 and non-removable storage 510 including, but not limited to, magnetic or optical disks or tapes. Processing unit 500 may also contain network connection(s) 516 that allow the device to communicate with other devices. For instance, the processing unit 500 may communicate with a processing unit in a base station using the network connection. It is to be appreciated that the network connection(s) may include components to wirelessly communicate with other devices. Processing unit 500 may also have the ability to interact with input device(s) 514 such as a keyboard, mouse, touch screen, etc. Output device(s) 512 such as a display, speakers, printer, etc. may also be connected with the processing unit 500. The additional devices may be connected to the bus in order to facilitate communication of data among the components of the processing unit 500. All these devices are well known in the art and need not be discussed at length here.

The processor 506 may be configured to execute program code encoded in tangible, computer-readable media. Computer-readable media refers to any media that is capable of providing data that causes the processing unit 500 (i.e., a machine) to operate in a particular fashion. Various computer-readable media may be utilized to provide instructions to the processor 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as electromagnetic, acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processor 506 may execute program code stored in the system memory 504. For example, the bus may carry data to the system memory 504, from which the processor 506 receives and executes instructions. The data received by the system memory 504 may optionally be stored on the removable storage 508 or the non-removable storage 510 before or after execution by the processor 506.

Processing unit 500 typically includes a variety of computer-readable media. Computer-readable media can be any available media that can be accessed by the processing device and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processing unit 500. Any such computer storage media may be part of the processing unit 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain. These publications include the following, which are all fully incorporated by reference:

[1] American Turpentine Farmers Association: http://russelldoc.galib.uga.edu/atfa/history/index.html. The Richard B. Russell Library for Political Research and Studies, University of Georgia Libraries (2010).

[2] Borenstein J. and Koren Y.: "The Vector Field Histogram—Fast Obstacle Avoidance for Mobile Robots", IEEE Journal of Robotics and Automation Vol 7, (3), pp. 278-288 (1991)

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A robotic system to identify and tap slash pine trees and collect their oleoresin for processing, said robotic system comprising an autonomous vehicle equipped with:
   an industrial robot with a controller for performing a sequence of robotic operations required for tapping the slash pine trees, said robot comprising a robotic arm having a master quick-connect at an end-of-arm of the robotic arm;
   a plurality of robotic tools each equipped with a quick-connect system for automated pickup and release of each of the plurality of robotic tools by the robotic arm using the master quick-connect said plurality of robotic tools comprising:
      a spindle for drilling a plurality of boreholes in the slash pine trees;
      a sprayer tool for spraying one or more of the plurality of boreholes with flow-stimulating chemicals and tree trunk with an insecticide; and
      a robot gripper for handling and inserting a tube with a pre-attached collection bag in one of the plurality of boreholes and plugs in two or more of the other of the plurality of boreholes;
   a rover navigation control system, said navigation control system comprising an on-board real-time-target computer having one or more processors in communication with a memory, and with input and output modules for communication with sensors and other peripherals and installed with a real-time-operating system and control software for navigation, said rover navigation system comprising at least a global navigation satellite system (GNSS) with sensors and encoders and a Light Detection and Ranging (LiDAR) system;
   at least one camera, one or more sensors and instrumentation used for navigation, obstacle avoidance, odometry and machine vision, wherein the one or more sensors, the machine vision, and the LiDAR system work in combination to identify cylindrical objects equal to, or larger than approximately 8 inches in diameter at approximately 5 feet elevation from a ground and perform image analysis on the cylindrical objects and identify based on the image analysis of at least a bark of the cylindrical objects if at least one of the cylindrical objects is one of the slash pine trees;
   an air compressor used for actuating automated tool changers and various robotic tools of the plurality of robotic tools; and a powertrain for long-range motive and auxiliary power; and
   a force and torque sensor attached between the robotic arm's end-of-arm and the master quick-connect, wherein the industrial robot programmatically feeds a drilling tool attached to the spindle towards the one of the slash pine trees while a magnitude of force and torque components are monitored, wherein a moment the drilling tool touches a surface of the one of the slash pine trees is indicated by a sudden increase in the magnitude of one or more of the monitored force and torque components and at this moment, coordinates of a tip of the drilling tool and tool orientation relative to a world frame of the industrial robot are recorded programmatically in a global position register of the memory, wherein the coordinates correspond to a center of a mouth of one of the plurality of boreholes,
   wherein the rover navigation control system utilize both the GNSS and the LiDAR system for navigation and obstacle avoidance and to control a drivetrain to cause the autonomous vehicle to approach the identified one of the slash pine trees for operations,
   wherein the GNSS is used to obtain GNSS coordinates of the one of the slash pine trees, the machine vision is used to obtain a measured diameter of the one of the slash pine trees, and the at least one camera is used to capture a digital image of the one of the slash pine trees, and wherein the GNSS coordinates, the measured diameter of the one of the slash pine trees, and the captured digital image are stored in the memory of the on-board real-time-target computer.

2. The robotic system according to claim 1, wherein said spindle or plurality of spindles are mounted on linear actuators driven by stepper or servo motors and used for drilling the plurality of boreholes.

3. The robotic system according to claim 1, wherein said powertrain comprises a fuel cell stack, methanol reformer for on-board production of hydrogen, battery and DC to AC inverter.

4. The robotic system according to claims 1, wherein the navigation control system further comprises
   a coprocessor computer with software installed for processing machine vision, navigation and other operations; and
   a networking system with wireless capability for data communication between said real-time-target computer, the coprocessor computer, and the other peripherals.

5. The robotic system according to claim 4, further comprising a base station computer for displaying rover information to the base station, said base station remote from the autonomous vehicle, wherein the base station communicates wirelessly with the real-time-target computer, coprocessor computer, and the other peripherals.

6. A robotic system to identify and tap slash pine trees and collect their oleoresin for processing, said robotic system comprising an autonomous vehicle equipped with:
   an industrial robot with a controller for performing a sequence of robotic operations required for tapping the slash pine trees, said robot comprising a robotic arm having a master quick-connect at an end-of-arm of the robotic arm;
   a plurality of robotic tools each equipped with a quick-connect system for automated pickup and release of each of the plurality of robotic tools by the robotic arm using the master quick-connect;
   a rover navigation control system, said navigation control system comprising an on-board real-time-target computer having one or more processors in communication with a memory, and with input and output modules for communication with sensors and other peripherals and installed with a real-time-operating system and control software for navigation, said rover navigation system comprising at least a global navigation satellite system (GNSS) with sensors and encoders and a Light Detection and Ranging (LiDAR) system;
   at least one camera, one or more sensors and instrumentation used for navigation, obstacle avoidance, odometry and machine vision, wherein said one or more sensors, machine vision, and the LiDAR system work in combination to identify cylindrical objects equal to, or larger than approximately 8 inches in diameter at approximately 5 feet elevation from the ground and perform image analysis on the cylindrical objects and identify based on the image analysis of at least a bark of the cylindrical objects if at least one of the cylindrical objects is one of the slash pine trees;

an air compressor used for actuating automated tool changers and various robotic tools of the plurality of robotic tools; and a powertrain for long-range motive and auxiliary power; and force and torque sensor attached between the robotic arm's end-of-arm and the master quick-connect, wherein the industrial robot programmatically feeds a drilling tool towards the one of the slash pine trees while a magnitude of force and torque components are monitored, wherein a moment the drilling tool touches a surface of the one of the slash pine trees is indicated by a sudden increase in the magnitude of one or more of the monitored force and torque components and at this moment, coordinates of a tip of the drilling tool and tool orientation relative to a world frame of the industrial robot are recorded programmatically in a global position register of the memory, wherein the coordinates correspond to a center of a mouth of one of the plurality of boreholes, wherein the rover navigation control system utilize both the GNSS and the LiDAR system for navigation and obstacle avoidance and to control a drivetrain to cause the autonomous vehicle to approach the identified slash pine tree for operations, wherein the GNSS is used to obtain GNSS coordinates of the one of the slash pine trees, the machine vision is used to obtain a measured diameter of the one of the slash pine trees, and the at least one camera is used to capture a digital image of the one of the slash pine trees, and wherein the GNSS coordinates, the measured diameter of the one of the slash pine trees, and the captured digital image are stored in the memory of the on-board real-time-target computer.

\* \* \* \* \*